United States Patent Office 3,362,972
Patented Jan. 9, 1968

3,362,972
PROCESS FOR THE PREPARATION OF CERTAIN MOLYBDENUM AND VANADIUM SALTS
John Kollar Wallington, N.J., assignor to Halcon International Inc., a corporation of Delaware
No Drawing. Filed June 29, 1964, Ser. No. 378,943
15 Claims. (Cl. 260—414)

ABSTRACT OF THE DISCLOSURE

Method of preparing a hydrocarbon soluble salt of Mo or V by heating a Mo compound, wherein Mo has a valence of +6, or a V compound wherein V has a valence of +5, with a carboxylic acid of from 4 to 50 carbon atoms having at least 4 carbon atoms per carboxylic group.

---

This invention relates to the preparation of hydrocarbon-soluble forms of molybdenum and vanadium; more particularly to the preparation of carboxylic acids salts thereof containing such metals in appreciable concentration which are suitable for use as catalysts in a hydrocarbon or the like organic medium, and the invention also relates to unique procedures for preparing such salts using oxalic acid as a reactant.

Various heavy metal salts are commercially available and are extensively used as dryers and treating agents in coating, films, lacquers and the like. Generally, these salts may be prepared by a so-called precipitation or wet method, or by the fusion of the appropriate metal oxide and appropriate acid. However, so far as is known, the preparation of molybdenum or the like salts which are soluble in a hydrocarbon medium is extremely difficult, especially for preparing compositions with a high metal content. Accordingly the art is confronted by the problem of providing acceptable procedures for preparing molybdenum and the like metal salts, especially in compositions with a high concentration of the metal compound and relatively free of undesirable materials.

The discoveries associated with the invention and relating to the solution of the above problems, and the objects achieved in accordance with the invention as set forth herein include the provision of:

a process for preparing a salt of Mo or V which is soluble in a hydrocarbon medium, which process comprises heating a compound of Mo at a valence of +6 or of V at a valence of +5 with a hydrocarbon carboxylic acid of 4 to 50 carbon atoms having about at least 4 hydrocarbon carbon atoms per carboxylic group, whereby a molybdenum of vanadium salt of the said hydrocarbon acid is formed;
said compound being an oxalate;
such a process wherein the metal is molybdenum;
such a process wherein the final salt composition contains 5% of molybdenum by weight;
such a process wherein the metal is vanadium;
such a process wherein the hydrocarbon acid is a fatty acid of up to 20 carbon atoms;
such a process wherein the hydrocarbon acid is a naphthenic acid of 8 to 50 carbon atoms;
such a process wherein the heating is at a temperature of about 140° to 240° C. for about 2 to 6 hours;
such a process wherein the salt composition contains 5% of vanadium by weight;
such a process wherein the oxalate compound is prepared by heating .5 to 1.2 mols of the inorganic compound of the heavy metal of the stated valence with one mol of oxalic acid in the presence of .5 to 50 parts by weight of water per part of oxalic acid at a temperature in the range of 100° to 150° C. and corresponding pressure to maintain a liquid aqueous phase for a time in the range of one to 2.5 hours, and then removing water;
such a process carried out in the presence of the carboxylic acid of 4 to 50 carbon atoms;
such a process wherein the inorganic compound is $MoO_3$ and the carboxylic acid is hexanoic acid;
such a process wherein the final composition contains 5% Mo by weight in hydrocarbon soluble form;
and other objects which will be apparent as details or embodiments of the invention are set forth hereinafter.

In order to indicate still more fully the nature of the present invention, the following examples of typical procedures are set forth in which parts and percents mean parts and percents by weights, respectively, unless otherwise indicated, it being understood that these examples are presented as illustrative only and they are not intended to limit the scope of the invention.

EXAMPLE 1

Molybdenum hexanoate is prepared by heating $MoO_3$ (144 gms.), water (400 gms.), oxalic acid dihydrate (126 gms.) and hexanoic acid (90–95% purity) (1940 gms.), at a temperature of 100° C. with vigorous agitation for about one hour. All the $MoO_3$ goes into solution. Then water is stripped or flashed off by heating, and the temperature is gradually raised to 150° to 200° C., and heating is continued at this temperature for 4 to 6 hours, with vigorous stirring. The desired hexanoate composition is formed directly with about 5% (wt.) content of the metal component (Mo) and is substantially free of undesirable materials.

While there is no intent to be limited by theory, it is believed that during the reaction, the valence of the molybdenum may change from +6 to a lower value, and that oxalate ion may be decomposed to carbon dioxide and water in a redox reaction. Vapors are evolved, and they contain water and carbon dioxide (determined by qualitative analysis).

This is a most surprising result, especially since in the absence of oxalic acid, the hexanoate is not formed, i.e., no hydrocarbon-soluble material is formed. Additionally, substitution of formic acid for the oxalic acid on a mol for mol basis does not give the hexanoate, i.e., no hydrocarbon-soluble material is formed. Also if the molybdenum is initially in a lower valence form, e.g., a valence of four, the hexanoate is not formed; i.e., no hydrocarbon-soluble material is formed.

The hexanoic acid need not be of high purity but can be a distilled cut containing a small portion of 7-carbon and/or 8-carbon atom acids as well as 5-carbon and/or 4-carbon atoms acids.

The resulting molybdenum hexanoate composition is particularly suitable and effective for use as a catalyst in the oxidation of propylene oxide by means of a peroxide type oxidizing agent. The hexanoate is soluble in hydrocarbons.

EXAMPLE 2

The procedure of Example 1 is repeated using 182 gms. $V_2O_5$, 252 gms. oxalic acid dihydrate, 500 gms., water and 1900 gms. of hexanoic acid (90 to 95% purity). After 2 hours at 100° C. the $H_2O$ is flash distilled and the temperature is raised. Heating at 180° to 200° C., is for 2 to 6 hours. The product contains about 5% V as hexanoate in solution.

EXAMPLE 3

The Example 1 procedure is repeated using a distilled naphthenic acids cut, and similar results are obtained.

EXAMPLE 4

The Example 1 procedure is repeated using octanoic acid (of about 90% purity), the balance of acids being 6, 7, 9 and 10-carbon atom fatty acids, and similar results are obtained.

Similar results to those of Example 1 are obtained by using hexanoic acid with molybdenum oxalate (in the same proportion of hexanoic acid and Mo) and heating at 150° to 200° C. for 4 to 6 hours.

Also the Example 1 procedure may be modified by adding the hexanoic acid after removal of water, and similar results are obtained.

Comparable results to the foregoing may be obtained with various modifications thereof, including the following:

In place of the molybdenum trioxide or vanadium pentoxide, other highest valence compounds of these metals or mixtures of such compounds may be used, e.g., the corresponding peroxy-acids, acids, and the like, and the corresponding hexanoate formed. Mixtures of such metal compounds may be used; instead of hexanoic acid, an alkyl, alkenyl, aralkyl, and the like carboxylic acids of up to 50 carbon atoms or mixtures thereof, may be used. The acids may contain 1, 2, or more carboxylic groups, however, it is preferred that there be present at least 4 hydrocarbon carbon atoms per carboxylic carbon in order to provide the desired solubility in a hydrocarbon or the like organic medium. Mono-carboxylic acids are preferred. These may be pure fatty acids of the formula RCOOH, where R is an alkyl group of 4 to 30 carbon atoms, distilled cuts of fatty acids or mixtures, naphthenic acids, acids derived from natural oils and waxes, tall oil acids, abietic acid, tung oil acids, linoleic acid, oleic acid, and the like.

Generally, one mol of oxalic acid is used per mol of the heavy metal oxide (e.g., $MoO_3$) or compound used; however, somewhat lesser or greater proportions are operative, e.g., 0.8 to 1.3 mols of this acid per mol of the heavy metal compound. All of the metal compound reactant used should go into solution in water.

The proportion of carboxylic acid groups (e.g., of acids of 5 to 50 carbon atoms) may be 1 to 100 mols per mol of the heavy metal compound ($MoO_3$, or the corresponding oxalate) desirably 1.5 to 50 mols, and preferably 2 to 20 mols.

The proportion of water used is .5 to 50 parts by weight per part of oxalic acid, desirably .75 to 30 parts, and preferably 1 to 15 parts. The amount of water is kept low, but sufficient water is used to fluidize the reaction mixture. The heating of the aqueous mixture is at 100° C. for one to 2.5 hours; then water is removed, e.g., by evaporation; higher temperature may be used with elevated pressure, e.g., 150° C.

The heating of the water-free mixture is at about 140° to 240° C. for 2 to 6 hours; at such temperature, oxalate decomposes.

In view of the foregoing disclosures, variations and modifications thereof will be apparent to one skilled in the art, and it is intended to include within the invention all such variations and modifications except as do not come within the scope of the appended claims.

What is claimed is:

1. A process for preparing a salt of a metal of the group consisting of Mo and V which is soluble in a hydrocarbon medium, which process comprises heating an oxalate compound of a metal of the group consisting of Mo at a valence of +6 and of V at a valence of +5 with a hydrocarbon carboxylic acid of 4 to 50 carbon atoms having about at least 4 carbon atoms per carboxylic group, whereby the said hydrocarbon-soluble salt is formed.

2. A process of claim 1 wherein the metal is molybdenum.

3. A process of claim 2 wherein the hydrocarbon acid is a fatty acid of up to 20 carbon atoms.

4. A process of claim 2 wherein the hydrocarbon acid is a naphthenic acid of 8 to 50 carbon atoms.

5. A process of claim 2 wherein the temperature is in the range of 140° to 240° C. and the time is in the range of about 2 to 6 hours.

6. A process of claim 5 wherein the final salt composition contains at least 5% of molybdenum by weight.

7. A process of claim 1 wherein the metal is vanadium.

8. A process of claim 7 wherein the hydrocarbon acid is a fatty acid of up to 20 carbon atoms.

9. A process of claim 7 wherein the hydrocarbon acid is a naphthenic acid of 8 to 50 carbon atoms.

10. A process of claim 9 wherein the temperature is in the range of 140° to 240° C. and the time is in the range of about 2 to 6 hours.

11. A process of claim 10 wherein the salt composition contains at least 5% of vanadium by weight.

12. A process of claim 1 wherein the oxalate compound is prepared by heating .5 to 1.2 mols of an inorganic compound of the heavy metal of the stated valence with one mol of oxalic acid in the presence of .5 to 50 parts by weight of water per part of oxalic acid at a temperature in the range of about 100° to 150° C. and corresponding pressure to maintain a liquid aqueous phase for a time in the range of one to 2.5 hours, and then removing water.

13. A process of claim 12 carried out in the presence of the carboxylic acid of 4 to 50 carbon atoms.

14. A process of claim 12 wherein the inorganic compound is $MoO_3$ and the carboxylic acid is hexanoic acid.

15. A process of claim 14 wherein the final composition contains 5% Mo by weight in hydrocarbon-soluble form.

References Cited
UNITED STATES PATENTS 3,162,660   12/1964   Crayton _____ 260—414

ALEX MAZEL, *Primary Examiner.*

NICHOLAS S. RIZZO, *Examiner.*

J. A. NARCAVAGE, *Assistant Examiner.*